Jan. 6, 1948.   M. N. YARDENY   2,433,970
ELECTRIC MOTOR FOLLOW-UP SYSTEM
Filed Oct. 18, 1941   2 Sheets-Sheet 1

MICHEL N. YARDENY
INVENTOR.

BY John P. Wikonow

ATTORNEY

Jan. 6, 1948. M. N. YARDENY 2,433,970
ELECTRIC MOTOR FOLLOW-UP SYSTEM
Filed Oct. 18, 1941 2 Sheets-Sheet 2

MICHEL N. YARDENY
INVENTOR.

ATTORNEY

Patented Jan. 6, 1948

2,433,970

UNITED STATES PATENT OFFICE 2,433,970

ELECTRIC MOTOR FOLLOW-UP SYSTEM

Michel N. Yardeny, New York, N. Y.

Application October 18, 1941, Serial No. 415,544

5 Claims. (Cl. 318—31)

My invention relates to remote control apparatus and has particular reference to electrically operated apparatus for transmitting motion at a distance.

More particularly, the invention provides a novel and improved apparatus of the so-called follow-up type and incorporating two drive means, one at a controlled point for moving a useful load and the other at a control point for moving one of a pair of independently movable electrically conductive control elements, the relative positions of which govern movement of the load or effect stopping of the load. In this type of apparatus, both the drive means are desirably reversible, so that the control elements may be set to cause movement of the load in one direction or the other; and it is also convenient in this type of apparatus to have each drive means comprise or include an electric motor of the reversible type.

Therefore, in the exemplifying embodiment of the apparatus of my invention as described herein, each drive means is illustratively shown as including a reversible electric motor, and in such embodiment the motor at the control point, hereinafter called the pilot motor, and also the motor at the controlled point, hereinafter called the load motor, are each shown as having two reversing windings, so that when one winding of each motor is energized both motors rotate in one direction and when the other winding of each motor is energized both motors rotate in the opposite direction and when both windings of both motors are energized both motors are stopped.

In follow-up apparatus of the kind to which the invention relates, where two independently movable electrically conductive control elements are used to govern load movement as aforesaid, a satisfactory arrangement is to have one element comprise conducting means having a gap or neutral point and to have the other element comprise a contact member for the conducting means. Then, with one of the two control elements adapted to be moved by the pilot motor and with the other element manually or otherwise operable, the arrangement of the apparatus may be such that when the two control elements are relatively positioned for engagement of the contact member with the conducting means at any one of an infinite number of points along the latter at either side of the gap or neutral point, both motors will be caused to rotate in one direction or the other, according as the engagement between the control elements is at one side or the other of the gap or neutral point, and with the pilot motor then rotating to move the control element moved by it relative to the other element in the direction required to effect an engagement between the control elements such that the contact member is at the gap or neutral point of the conducting means thereby to stop both motors. The exemplifying embodiment of the invention herein described is illustrated in the accompanying drawings as including an arrangement as just described.

An important feature of my invention is the employment of a load moving controlled device including a motor of a type capable of delivering a torque adequate to move the load at speeds of the motor below its full running speed, and a controlling device for varying the speed of the load motor at will, so that during close approach of the load to its selected stopping position, final positioning of the load may be easily and quickly effected and with a precision hitherto not possible. When a load motor of the class just mentioned is combined in a follow-up apparatus with a controlling device of the class above described, full advantage is thereby permitted to be taken of the fact that such a motor, whether A.-C. or D.-C. and when A.-C. independent of frequency variations, acts in response to very brief surges of energizing current in a manner not possible with motors of the synchronous type. Motors of the synchronous type are characterized by the fact that a torque adequate to move the load is not begun to be delivered until the motor has reached full running speed; and, as a result, regardless of the type of motor controlling device employed, there is a time lag between energization of the motor and the beginning of the load movement in consequence of the time required for the load motor to attain full running speed after it is energized. A motor of the type employed by me, however, is capable of delivering a load moving torque when energized for such a fleetingly brief period of time that after the motor is energized it may be deenergized yet to move the load before said energization has continued long enough to bring the motor up to full running speed; and in consequence of this movement of the load may proceed by exceedingly minute steps of advance. On the other hand, this characteristic of a motor of the kind employed by me cannot be made use of due to the mental reflex involved in the human equation, unless the manually operable element of the controlling device is capable of doing two things, and doing both these two things as the result of merely a single manipulation of said element; the first being to energize the load motor and the second being to deenergize the motor before it has come up to full running speed. Then, and then only, can the apparatus be employed to control movement of the load so that a step advance thereof is of the minuteness required to prevent the load from overrunning a selected position.

In accordance with the foregoing, when a pilot motor is used for operating the control element other than the manually movable one, an essential of the invention is the use of non-synchronous pilot and load motors, so that in this case the load motor is of a type capable of delivering a load moving torque at speeds below full running speed.

In either of the above discussed arrangements, according to my invention, the stopping position of the load is independent of the placement of the manually movable element effected by the manipulation aforesaid. Therefore, another feature of the invention is the combination with either of said arrangements of a means controlled by the load movement and by that alone, for indicating at a control point the true position of the load at any instant, and for acting as a guide in said manipulation. Such indicating means would be required where the control location is remote from the load location, or where, regardless of the distance of the load from the control point, the nature of the load or the kind of movement which is imparted to it is such that the true position of the load at any instant cannot be easily or adequately checked by direct observation of the load itself.

By the control apparatus of the present invention, a new method of final positioning of the load by varying the speed of load advance toward a desired stopping position, and by successive minute advancements of the load toward said stopping position as the same is closely approached, thereby to decrease materially the time required for placing the load with extreme accuracy in the desired position, is provided, such method being described and claimed in my copending U. S. patent application Serial No. 526,423, now abandoned.

Another important feature of my invention is one also having the object, among others, of decreasing the time required for placing the load with extreme accuracy in the desired position, which feature is the inclusion in the follow-up system of a plurality of switch means of different kinds and for alternative use or in sequence variable at will, one of said switch means being the hereinabove mentioned pair of independently movable control elements comprising conducting means having a neutral point and a contact member for said conducting means.

Another important feature of my invention, likewise aimed at providing an improved follow-up system, particularly so far as reducing the time required for placing a load with extreme accuracy in a desired position is concerned, is the provision of means whereby the independently movable control elements may be manually relatively moved, and thus moved to an exceedingly minute extent in finally positioning the load. The feature of my invention now being discussed involves the provision of a motion reducing transmission of high ratio from an actuator for the manually movable control element to that control element. This feature, when used in combination with the feature of employing a load motor capable of delivering a load moving torque at speeds below full running speed, permits utmost advantage to be taken of the fact that this type of motor is operative to move the load when rotating at even very low speed. Thus, in finally positioning the load, the motor may be given such a sufficiently fleetingly brief current surge as to start a torque-delivering rotation which because it ends so soon after it begins, is a very, very slow rotation.

I also provide means to cut off current supply to the motors after they are stopped, such means including a relay, preferably of delayed action type, and shown as having two opposed windings and hence similar to the one disclosed in my U. S. Patent No. 2,342,717.

The foregoing and other features and advantages of my invention will be fully understood or become apparent from the following description when taken in connection with the accompanying drawings showing an embodiment of the invention as now favored; it being pointed out, however, that certain of these features, not herein claimed, are claimed in my copending application Serial No. 389,162.

Figure 1:
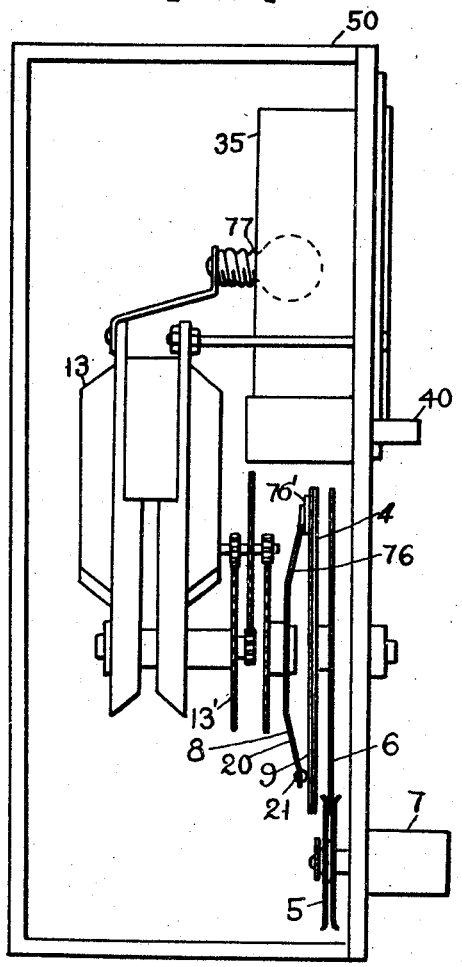
Fig. 1 is a side view of a control device forming part of said embodiment of my follow-up apparatus.
Figure 3:
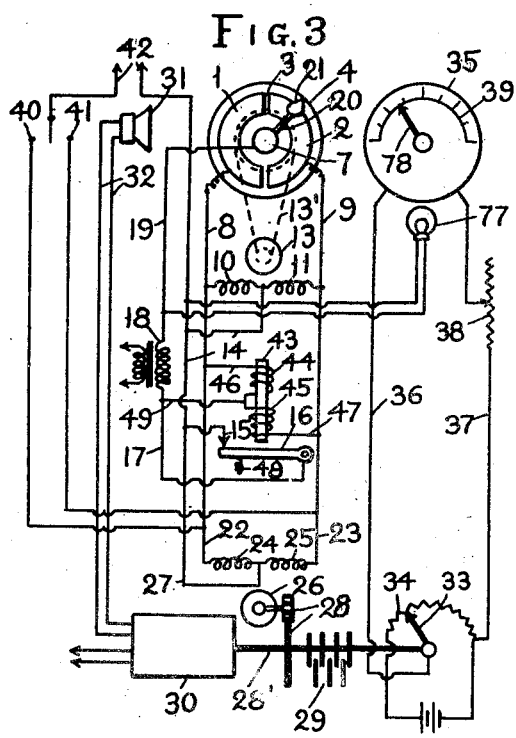
Fig. 3 is a diagram of connection of the same.
Figure 4:
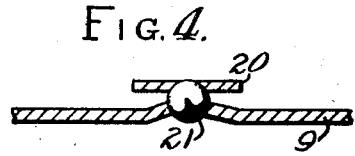
Fig. 4 is a detail view of a ball contact.

My follow-up system is shown by way of example diagrammatically in Fig. 3 and consists of a pair of conducting members or sectors 1 and 2 separated from each other preferably by a narrow gap or neutral point 3, these members 1 and 2 being mounted on an insulation disc 4. The ends of sectors 1, 2 are preferably raised adjacent to the gap 3, as shown in Fig. 4. The disc 4 can be rotated, manually or otherwise, through gears 5 and 6 and a knob 7 (Fig. 1). The sectors 1 and 2 are connected by leads 8 and 9 with reversing field windings 10 and 11 of a pilot motor 13. The windings have a common tap connected by a lead 14 with a contact point 15 of a relay armature 16, a lead 17 from said armature connecting the same with a transformer or other source of electric current 18. A lead 19 connects the transformer with a rotary contact member 20, mounted concentrically with the sectors 1 and 2 and operated by the motor through a suitable transmission 13'. The contact member has a ball-shaped contact point 21, slidably engaging the sectors 1 and 2. The ball 21 is sufficiently large to bridge the gap 3, although a large gap may be employed, for completely interrupting the circuit.

The coils 10, 11 are wound or connected in the opposite directions, so that the motor will rotate in one or the other direction, depending on which sector 1 or 2 is engaged by the contact member 20. The motor will be positively stopped when the contact ball 21 bridges the gap 3, thereby simultaneously energizing both field coils and creating opposing electromotive or magnetic forces in the motor.

The motor windings 10, 11 are connected by leads 22, 23 with corresponding reversing windings 24, 25 of a second or load motor 26. The common tap of the windings 24, 25 is connected by a lead 27 with the lead 14.

The load motor therefore will rotate in the same direction as the pilot motor 13 and both will have their two reversing windings energized at the same time for stopping the motors. The load motor can be connected by gears 28 with a shaft 28' operating a tuning device such as variable condenser 29 of a radio receiver 30. The latter may be provided with an extension loud speaker 31 at the point of control, connected by leads 32 with the receiver.

In order to enable the operator at the control point to observe the actual positions of the radio receiver tuning device, the latter is connected with a contact arm 33 of a potentiometer comprising a resistor 34 and indicator 35 connected by leads 36, 37 through an adjusting resistor 38. The dial 39 of the indicator 35 can be calibrated in any suitable units, such as kilocycles, etc., and may be provided with an electric lamp (Fig. 1) for illuminating its dial.

It should be noted that with my follow-up apparatus it is not contemplated to have the two motors operating in a perfect synchronism and they may rotate even at different velocities, since the load motor, when operated for placing the controlled device, such as a tuning condenser, in a desired position is thus operated in accordance with readings of the indicator, the latter being operated by the load motor through the potentiometer.

The relay means including the armature 16 is provided for disconnecting the motors from the circuit after they have been stopped by the opposing magnetic or electromotive forces set up by energization of both reversing windings of both motors. This relay means also includes a magnet 43 with coils 44, 45 wound in the opposite directions and connected with the respective windings 10, 11 and 24, 25 by leads 46, 47, the middle tap being connected by a lead 49 with the transformer 18. The magnet is energized when only one of its coils is energized, i. e., when the motors are rotating. When the motors stop, both magnet coils are energized and the magnet is demagnetized, releasing the armature 16, which is pulled away by a spring 48, breaking the contact 15 and disconnecting the motors from the source of current.

It has already been stated that the contact ball 31 may be made sufficiently large to bridge the gap 3, or a larger gap may be employed, for interrupting the circuit. As has just been explained, when the contact ball bridges the gap, the final operation is to disconnect the motors from the current source by breaking the circuit at the contact point 15. In other words, whether the gap 3 is made larger or smaller, that is, whether the gap is of such width as to be bridged by the contact ball 31 when the ball reaches the gap or is of a greater width to allow the ball to reach the gap without bridging it, the action of the coils 44 and 45 of the magnet 43 in demagnetizing the latter is the same. This demagnetization occurs in response either to the contact ball reaching the gap without bridging it or to the contact ball reaching the gap to bridge it. When the contact ball reaches the gap to bridge it, both the coils 44 and 45 are energized, thereby deenergizing the magnet 43; and when the contact ball reaches the gap without bridging it, both the coils 44 and 45 are deenergized, in this case also to deenergize the magnet. The relay coils are wound with a fine wire and connected in multiple with the motors. They have preferably large impedance in relation to the impedance of the motors, thereby consuming very little current.

Figure 2:
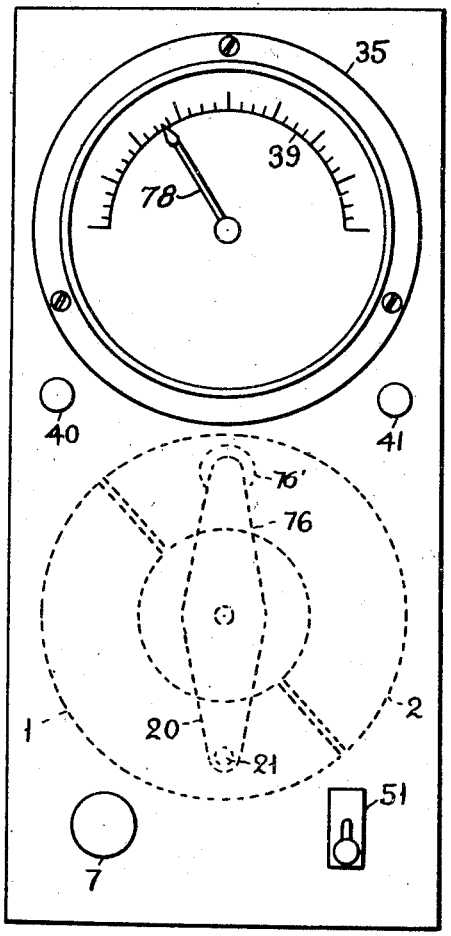
Fig. 2 is a front elevational view of the same.

The general arrangement of the apparatus is shown in Figs. 1 and 2 by way of an example. The pilot motor 13 and other parts are placed in a casing 50, a switch 51 being provided for disconnecting the circuit.

In order to advance the load more rapidly to a desired position, manually operable push buttons 40, 41 may be provided for connecting one reversing winding or the other of the load motor directly with a source of current 42.

Thus, to tune the receiver 30 to a particular station or frequency (or wave length), the load motor 26 is at first rapidly rotated by depressing one of the push buttons 40 or 41, the direction of rotation, as determined by the particular button depressed, which may be selected to provide the shortest movement for the load. Upon approach to the desired station or frequency, as seen on the indicator 35, the depressed button is released and the knob 7 rotated until the indicator pointer 78 reaches the desired point on the dial 39 of indicator 35. It may be noted that it is immaterial how much the knob is rotated or whether there is a slippage of the gears 5, 6, as the correct position reached by the receiver is indicated on the dial 39.

Induction squirrel-cage motors can be used to advantage, especially in the case of load motors, for stopping them by the opposing electromotive forces.

Figure 5:
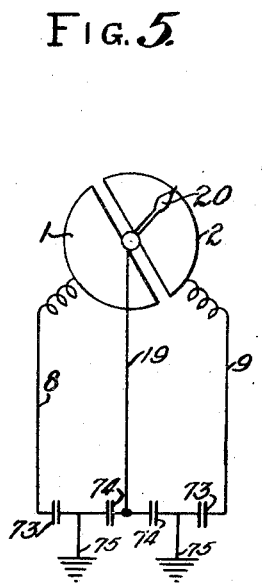
Fig. 5 is a diagrammatic view of a spark-quenching attachment.
Figure 3A:
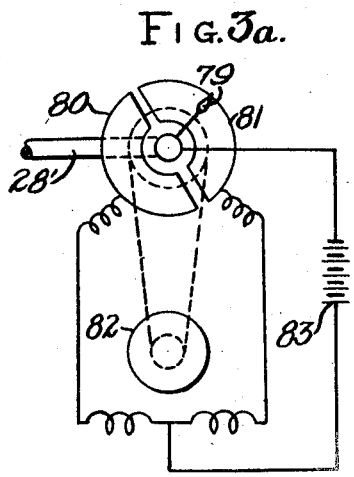
Fig. 3a is a diagrammatic view of a supplementary motor at a controlled station.

In order to suppress any tendency for sparking at the contact points and thereby prevent radio static, condensers 73, 74 may be connected across the sectors 1, 2 and the arm 20, with grounded middle points 75, this arrangement (see Fig. 5) being especially useful when the motor is stopped by the opposition of two currents.

The contact member or arm 20 may be provided with a resilient extension 76, extending in the opposite direction, and pressing against the sectors by an insulated end 76', thereby balancing the pressure at opposite points along the sectors.

A lamp 77 may be provided in the indicator for illuminating its dial when the device is connected with the outside source of current.

The shaft 28' can be also connected to a contact arm 79 sliding over contact sectors 80, 81 rotated by a second load motor 82 energized from a separate source 83. This motor can be used to operate various devices, such as a searchlight, gun mount, etc.

My apparatus can be used for operating any suitable device, such as radio tuning elements as shown in Fig. 4, various independent switches or contactors for operating rheostats, radio receivers, transmitters, measuring apparatus, fire control, etc.

It is understood that my remote control apparatus may be further modified without departing from the spirit of the invention as set forth in the appended claims.

I claim as my invention:

1. In an electrical control apparatus of the follow-up type for placing a useful load in any desired position, the combination of load moving means; load movement controlling means; a reversible load motor included in the load moving means; a reversible pilot motor included in the load movement controlling means and the operation of which affects operation of the load motor, said controlling means including two switch means manually operable in a desired order to cause desired differences in the speed of load movement at different stages of movement of the load toward a then desired stopping position, one of said switch means including two independently movable electrically conductive control elements, one element comprising conductive means having a neutral point, the other element comprising a contact member for engaging the conducting means, one of said elements being arranged to be moved by the pilot motor, the other being manually movable; means coacting with the last-mentioned switch means to cause rotation of both motors in one direction or the other in response to the contact member being at one side or the other of the neutral point and to render both motors inoperative for the purposes aforesaid in response to the contact member being at the neutral point; and means responsive to operation of the other switch means for controlling the direction of rotation of the load motor and for rendering the load motor inoperative to move the load, independently of operation of the first-mentioned switch means.

2. An electrical control apparatus of the follow up type for placing a useful load in any desired position comprising a pair of independently movable electrically conductive control elements, one element comprising conducting members separated by a gap, the other element comprising a contactor for engaging the conducting members, drive means including a reversible control motor for moving one of the elements, the other element being otherwise movable, a reversible load motor, both motors being connected in circuits with the conducting members, relay means having a pair of coils, each coil being connected in a circuit with one of the conducting members and a source of current for energizing either of the coils according as the contactor engages one or the other of the conducting members, both coils being energized when the contactor bridges the gap, and contact means controlled by the coils included in the motor circuits for connecting the motor circuit with the source of current in parallel with the corresponding coil circuit when either relay coil is energized for causing rotation of the motors in one direction or the other according as the contactor engages one or the other of the conducting members, and for disconnecting the motor circuits when both coils are energized, thereby stopping the motors.

3. An electrical control apparatus of the follow up type for placing a useful load in any desired position comprising a pair of independently movable electrically conductive control elements, one comprising conducting members separated by a gap, the other comprising a contactor for engaging the conducting members, a drive means including a control motor having two reversing windings for moving one of the elements, the other element being otherwise movable, a load motor having two reversing windings, a circuit means including two branches and a source of current, one branch including one of the conducting members and one of the windings of each motor, the second branch including the other conducting member and the second winding of each motor, relay means having a pair of coils, each coil being connected in parallel with the respective branch of the circuit means exclusive of the respective winding for energizing either of the coils according as the contactor engages one or the other of the conducting members and for energizing both coils when the contactor bridges the gap, and contact means controlled by the coils and included in the circuit means for connecting said circuit means including the respective winding with the source of current when either relay coil is energized, thereby causing rotation of the motors in one direction or the other according as the contactor engages one or the other of the conducting members, and for disconnecting the circuit means when both coils are energized, thereby deenergizing the motor.

4. An electrical control apparatus of the follow up type for placing a useful load in any desired position comprising a pair of independently movable electrically conductive control elements, one comprising conducting members separated by a gap, the other comprising a contactor for engaging the conducting members, a drive means including a control motor having two reversing windings for moving one of the elements, the other element being manually movable, an actuator for moving the manually movable control element, a speed reducing transmission between the actuator and the manually movable control element for minute displacements of the manually movable control element relative to the control element, a load motor having two reversing windings, a circuit means including two branches and a source of current, one branch including one of the conducting members with one of the windings of each motor, the second branch including the other conducting member and the second winding of each motor, relay means having a pair of coils, each coil being connected in parallel with the respective branch of the circuit means exclusive of the respective winding for energizing either of the coils according as the contactor engages one or the other of the conducting members and for energizing both coils when the contactor bridges the gap, and contact means controlled by the coils and included in the circuit means for connecting said circuit means including the respective winding with the source of current when either relay coil is energized, thereby causing rotation of the motors in one direction or the other according as the contactor engages one or the other of the conducting members, and for disconnecting the circuit means when both coils are energized, thereby deenergizing the motors.

5. An electrical control apparatus of the follow up type for placing a useful load in any desired position comprising a pair of independently movable electrically conductive control elements, one comprising conducting members separated by a gap, the other comprising a contactor for engaging the conducting members, a drive means including a control motor having two reversing windings for moving one of the elements, the other element being otherwise movable, a load motor having two reversing windings, a circuit means including two branches and a source of current, one branch including one of the conducting members and one of the windings of each motor, the second branch including the other conducting member and the second winding of each motor, relay means having a pair of coils, each coil being connected in parallel with the respective branch of the circuit means exclusive of the respective winding for energizing either of the coils according as the contactor engages one or the other of the conducting members and for energizing both coils when the contactor bridges the gap, and contact means controlled by the coils and included in the circuit means for connecting said circuit means including the respective winding with the source of current when either relay coil is energized, thereby causing rotation of the motors in one direction or the other according as the contactor engages one or the other of the conducting members, and for disconnecting the circuit means when both coils are energized, thereby deenergizing the motors, a pair of contacts, each being connected with a respective one of the load motor windings, and manually operable switch means for selectively connecting one of the contacts with the source of current, thereby controlling the directional rotation of the load motor independently of the control elements.

MICHEL N. YARDENY.

REFERENCES CITED

The following references are of record in the file of this patent:

UNITED STATES PATENTS

| Number | Name | Date |
|---|---|---|
| 2,113,197 | Lang | Apr. 5, 1938 |
| 2,036,091 | Mitchell | Mar. 31, 1936 |
| 713,258 | Weston et al. | Nov. 11, 1902 |
| 835,382 | Willard | Nov. 6, 1906 |
| 2,035,602 | Hubbard | Mar. 31, 1936 |
| 2,228,199 | Chance | Jan. 7, 1941 |
| 1,742,147 | Renwick | Dec. 31, 1929 |
| 1,850,598 | Mills et al. | Mar. 22, 1932 |
| 1,853,506 | Carter | Apr. 12, 1932 |
| 1,954,142 | Moffett | Apr. 10, 1934 |
| 1,983,137 | Koons | Dec. 4, 1934 |
| 2,041,398 | Carpenter | May 19, 1936 |
| 2,122,912 | Levy | July 5, 1938 |

FOREIGN PATENTS

| Number | Country | Date |
|---|---|---|
| 127,755 | Germany | Jan. 29, 1902 |
| 264,401 | Germany | Sept. 24, 1913 |
| 491,933 | England | Sept. 12, 1938 |